(12) United States Patent
Edge et al.

(10) Patent No.: US 10,970,473 B2
(45) Date of Patent: Apr. 6, 2021

(54) FORMATTING DOCUMENT OBJECTS BY VISUAL SUGGESTIONS

(71) Applicant: MICROSOFT TECHNOLOGY LICENSING, LLC, Redmond, WA (US)

(72) Inventors: Darren Edge, Beijing (CN); Taoyu Li, Beijing (CN); Xiongjian Mo, Beijing (CN)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 327 days.

(21) Appl. No.: 16/066,057

(22) PCT Filed: Dec. 29, 2015

(86) PCT No.: PCT/CN2015/099512
§ 371 (c)(1),
(2) Date: Jun. 25, 2018

(87) PCT Pub. No.: WO2017/113110
PCT Pub. Date: Jul. 6, 2017

(65) Prior Publication Data
US 2020/0285803 A1 Sep. 10, 2020

(51) Int. Cl.
*G06F 40/166* (2020.01)
*G06F 16/93* (2019.01)
(Continued)

(52) U.S. Cl.
CPC .......... *G06F 40/166* (2020.01); *G06F 3/0482* (2013.01); *G06F 16/904* (2019.01);
(Continued)

(58) Field of Classification Search
CPC ...... G06F 40/166; G06F 40/103; G06F 40/16; G06F 16/93; G06F 16/904; G06F 3/0482; G06F 40/155
See application file for complete search history.

(56) References Cited

U.S. PATENT DOCUMENTS

2006/0143562 A1    6/2006  Seurig et al.
2007/0061710 A1*   3/2007  Chartier ............... G06F 40/106
                                                    715/234
2009/0292987 A1*  11/2009  Sorenson ............. G06F 40/166
                                                    715/255

FOREIGN PATENT DOCUMENTS

CN    101258489 A    9/2008
JP    H05-298292 A   11/1993
(Continued)

OTHER PUBLICATIONS

"Supplementary Search Report Issued in European Patent Application No. 15911741.5", dated Jun. 28, 2019, 9 pages.
(Continued)

*Primary Examiner* — Roland J Casillas
(74) *Attorney, Agent, or Firm* — Merchant & Gould P.C.

(57) ABSTRACT

A solution for formatting document objects by visual suggestions is proposed. For a document including multiple editing units each of which contains multiple objects, a first editing rule is generated, the first editing rule indicating an edit performed on a first object in a document. Then, an editing suggestion is generated based on the first editing rule, the editing suggestion describing a candidate edit to be performed on a second object within a suggestion scope. The editing suggestion is then presented in a visual form to a user for selection.

20 Claims, 4 Drawing Sheets

(51) Int. Cl.
    *G06F 16/904*     (2019.01)
    *G06F 40/103*     (2020.01)
    *G06F 40/16*      (2020.01)
    *G06F 3/0482*     (2013.01)

(52) U.S. Cl.
    CPC ............ *G06F 16/93* (2019.01); *G06F 40/103* (2020.01); *G06F 40/16* (2020.01)

(56) References Cited

FOREIGN PATENT DOCUMENTS

| WO | 2012103159 A2 | 8/2012 |
|---|---|---|
| WO | 2014205756 A1 | 12/2014 |

OTHER PUBLICATIONS

Gulwani, Sumit, "Synthesis from Examples: Interaction Models and Algorithms", In Proceedings of the 14th International Symposium on Symbolic and Numeric Algorithms for Scientific Computing, Sep. 26, 2012, 7 Pages.

Raza, et al., "Programming by Example Using Least General Generalizations", In Proceedings of the Twenty-Eighth AAAI Conference on Artificial Intelligence, Jul. 27, 2014, 8 Pages.

Edge, et al., "Mixed-initiative approaches to global editing in slideware", In Proceedings of the 33rd Annual ACM Conference on Human Factors in Computing Systems, Apr. 1, 2015, 10 pages.

PCT International Preliminary Report on Patentability in Application PCT/CN20151,099512, dated Jul. 12, 2018, 5 pages.

International Search Report and Written Opinion for PCT/CN2015/099512 dated Sep. 30, 2016.

* cited by examiner

FORMATTING DOCUMENT OBJECTS BY VISUAL SUGGESTIONS

CROSS-REFERENCE TO RELATED APPLICATION

This application is a U.S. National Stage Application of PCT/CN2015/099512, filed Dec. 29, 2015, which application is hereby incorporated by reference. To the extent appropriate, a claim of priority is made to the above disclosed application.

BACKGROUND

In environments like document editing applications, a document often contains multiple editing units such as pages or slides. In some cases, different editing units may not be visible at the same time. Therefore, a user may have a problem to maintain visual consistency across objects of the multiple editing units after making changes on some of the objects. Typically, a user needs to navigate through each editing unit, formatting all the objects necessary for maintaining consistency. Therefore, making changes to a great number of document objects may be a time-consuming and error-prone task.

SUMMARY

In accordance with implementations of the subject matter described herein, a solution for formatting document objects by visual suggestions is proposed. For a document including multiple editing units, each of which contains multiple objects (for example, shapes, lines, paragraphs, and the like), implementations of the present invention generate a first editing rule, the first editing rule indicating an edit performed on a first object in a document. One or more editing suggestions may then be generated based on the first editing rule, the editing suggestion describing a candidate edit to be performed on a second object within a suggestion scope. The editing suggestion(s) may then be presented in a visual form to a user for selection.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar reference symbols are used to indicate the same or similar elements.

DETAILED DESCRIPTION

The subject matter described herein will now be discussed with reference to several example implementations. It should be understood these implementations are discussed only for enabling those skilled persons in the art to better understand and thus implement the subject matter described herein, rather than suggesting any limitations on the scope of the subject matter.

As used herein, the term "includes" and its variants are to be read as opened terms that mean "includes, but is not limited to." The term "or" is to be read as "and/or" unless the context clearly indicates otherwise. The term "based on" is to be read as "based at least in part on." The term "one implementation" and "an implementation" are to be read as "at least one implementation." The term "another implementation" is to be read as "at least one other implementation." The terms "first," "second," "third" and the like may refer to different or same objects. Other definitions, explicit and implicit, can be included below.

As described above, changing appearance attributes of a number of document objects is time-consuming and error-prone. To address this problem, some applications provide a formatting tool to allow users to apply non-spatial attributes like font or color of one object onto other objects. However, such a formatting tool usually does not support a propagation of spatial attributes like size or position. Moreover, some applications allow the users to set object attributes by use of one or more templates. This requires the desired layouts and text formats to be planned in advance. When the user wants to change an attribute of objects, he/she has to switch to and operate the templates rather than actual pages/slides. These and other potential problems can be solved by implementations of the subject matter described herein.

Figure 1:
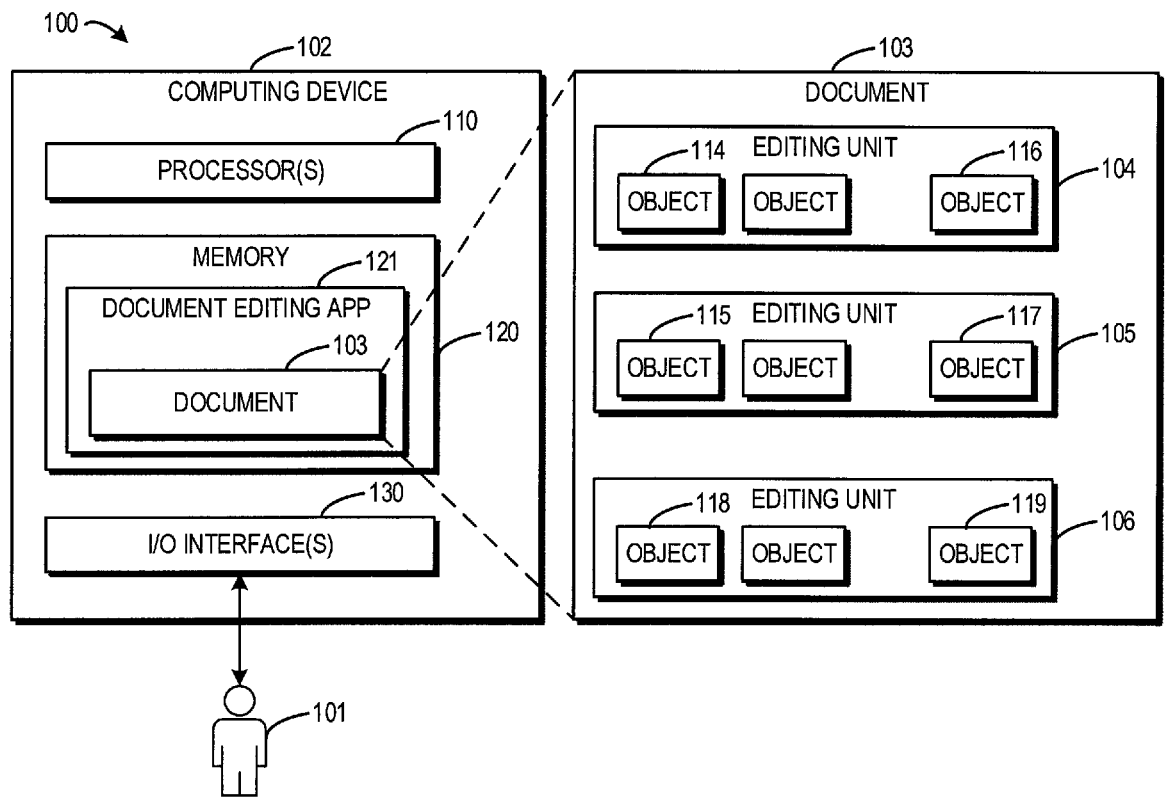
FIG. 1 is a block diagram of an environment 100 where implementations of the subject matter described herein can be implemented.

FIG. 1 illustrates a block diagram of an environment 100 where implementations of the subject matter described herein can be implemented. As shown, the environment 100 includes a user 101 and a computing device 102.

The computing device 102 may be a desktop computer, a laptop computer, a tablet, a smart phone, or any other types of computing device. The components of the computing device 102 may include, but are not limited to, one or more processors 110, a memory 120, and one or more I/O interfaces 130. The memory 120 may store various modules, applications, programs, or other data. Further, the memory 120 may include instructions that, when executed by the processor(s) 110, cause the processor(s) 110 to perform operations described herein for the computing device 102. In the computing device 102, the I/O interface(s) 130 may support one or more of various different input devices and output devices that enable the user 101 to interact with the computing device 102. For example, the input device(s) may include a user device such as keyboard, keypad, touch pad, trackball, and the like. The output device(s) may include a display, for example.

The computing device 102 may have additional features and/or functionality. For example, the computing device 102 may also include additional data storage devices (removable and/or non-removable), such as magnetic disks or optical disks. Such additional storage may include removable storage and/or non-removable storage. Computer-readable media may include at least two types of computer-readable media, namely computer storage media and communication media. Computer storage media may include volatile and non-volatile, removable, and non-removable media implemented in any method or technology for storage of information, such as computer readable instructions, data structures, program modules, program data, or other data. The system memory, the removable storage and the non-removable storage are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other medium that can be used to store the desired information and which can be accessed by the computing device 102. Any such computer storage media may be part of the computing device 102. Moreover, the computer-readable media may include computer-executable instructions that, when executed by the processor(s), perform various functions and/or operations described herein. In contrast, communication media may embody computer-readable instructions, data structures, program modules, or other data in a modulated data signal, such as a carrier wave, or other mechanism. As defined herein, computer storage media does not include communication media.

The memory 120 may store a document editing application 121 for processing a document 103. The documents 103 may be a presentation document or a text document. The document 103 may include one or more editing units. As used herein, the term "editing units" refers to basic units composing the document 103. Examples of the editing units include, but not limited to, slides in a presentation document or pages in a text document, such as editing units 104, 105 and 106 as shown in FIG. 1. Each of the editing units may include one or more objects (for example, shapes, lines, paragraphs or the like). For example, the editing unit 104 is shown to include objects 114 and 116, the editing unit 104 is shown to include objects 115 and 117 and the editing unit 106 is shown to include objects 118 and 119. This is merely for the purpose of illustration, without suggesting any limitation to the environment. In the following discussions, only for the purpose of illustration, the document 103 refers to a presentation document (such as a Microsoft PowerPoint® presentation) and the editing units 104, 105 and 106 represent three different slides within the presentation document.

The user 101 may perform a direct edit on the object 114 in the editing unit 104 via the input devices supported by the I/O interface(s) 130, such as changing the font of the object 114. Then, the user 101 may have an intention to perform a similar edit on the object 115 in the editing unit 105. That is, the user may want to change the font of the object 115 to be the same with the edited object 114 in order to maintain visual consistency. Implementations of the present invention provide a solution to format document objects by visual suggestions.

Figure 2:
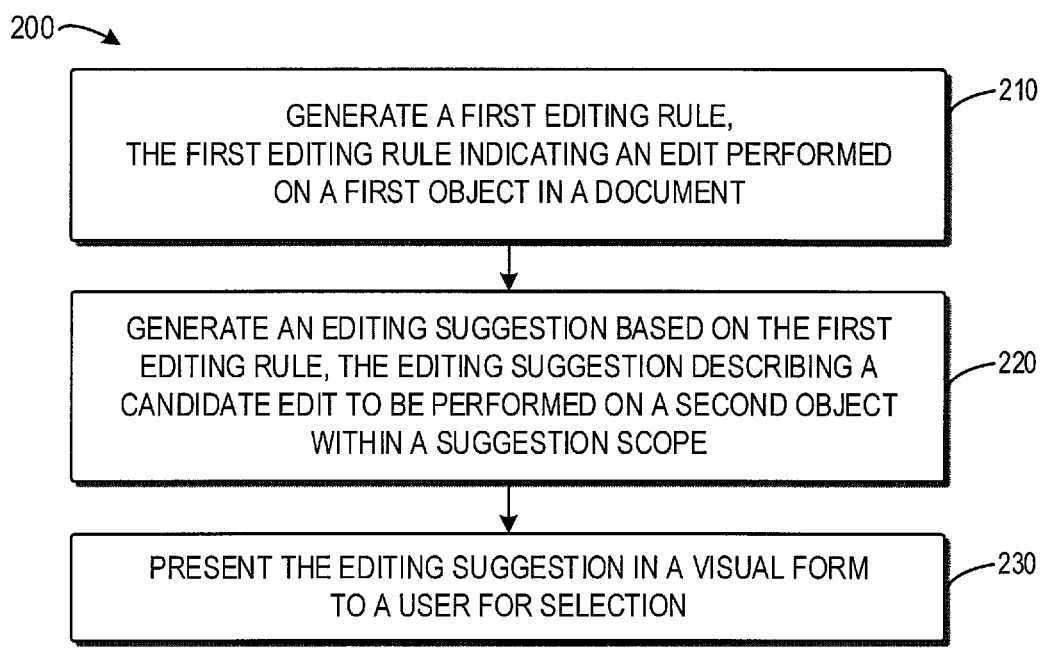
FIG. 2 is a flowchart of a method 200 for formatting document objects by visual suggestions in accordance with implementations of the present invention.

FIG. 2 illustrates a flowchart of a method 200 for formatting document objects by visual suggestions in accordance with implementations of the present invention. The method 200 can be implemented by the computing device 102 as shown in FIG. 1, for example. Alternatively, or in addition, the method 200 can be implemented as part of the document editing application 121. The method 200 will be described in connection with the example shown in FIG. 1. Only for the purpose of illustration, in the following discussions, the object 114 in the editing unit 104 is referred to as the "first object" and the object 115 in the editing unit 105 is referred to as the "second object".

In step 210, a first editing rule is generated, the first editing rule indicating an edit performed on the first object 114 in the document 103. In some implementations, the first editing rule can be generated in response to the first object 114 being edited by the user 101.

In some implementations, the first editing rule can take the form as follows:

$$\text{Conditions} \Rightarrow \text{Conclusion(s)} \tag{1}$$

where each condition and conclusion takes the form as an "Attribute:Value" pair. The conditions define which objects can be matched by the rule, and the conclusions describe how to edit these matching objects. The attribute may be any kind of visual attribute, including, but not limited to, a spatial attribute such as position, height, size and the like, a non-spatial attribute such as font, shape type, fill color and the like, content such as the text within a shape and so on. For example, the following rule (2) may turn all objects with a shape type of square to be those with a shape type of diamond, no matter what their size, color, border and the like.

$$(\text{ShapeType:Square}) \Rightarrow (\text{ShapeType:Diamond}) \tag{2}$$

All conditions of a rule should be satisfied by an object that matches the rule. For example, the following rule (3) may turn only all objects with a shape type of square and with a fill color of yellow to be those with a shape type of diamond.

$$(\text{ShapeType:Square,FillColor:Yellow}) \Rightarrow (\text{ShapeType:Diamond}) \tag{3}$$

Moreover, all conclusions of a rule should be applied to all objects matching the rule. For example, the following rule (4) may turn all objects with a shape type of square to be those with a shape type of diamond and with a fill color of yellow, no matter with their original fill color.

$$(\text{ShapeType:Square}) \Rightarrow (\text{ShapeType:Diamond,FillColor:Yellow}) \tag{4}$$

In some implementations, in response to an edit performed on the first object 114 by the user 101, the first editing rule can be generated as follows.

$$\begin{gathered}(\text{All Attribute:Value pairs of the edited first object} \\ \text{114 before the edit}) \Rightarrow (\text{The edited Attribute:} \\ \text{Value pairs})\end{gathered} \tag{5}$$

The first editing rule (5) may only match objects whose attributes all match those of the edited first object 114 prior to the edit.

In some implementations, an editing rule, such as the first editing rule, may operate on three levels of objects: shapes, paragraphs, and text runs. A shape rule may affect the entire shape, including all the text content within it. For example, a shape rule with a conclusion of "(FontColor:Red)" may set all the text of an matching object to be red, regardless of any text run color used previously. A paragraph rule may be created when the entire first or last paragraph of a multi-paragraph object is formatted, as if often done for differentiation or emphasis. For example, a paragraph rule may result in formatting the first or last paragraph of a similar multi-paragraph object, regardless of the prior formatting or text run structure of that paragraph. A text-run rule may be created when a single text run within an object is formatted, resulting in formatting another similar text run.

In some implementations, the first editing rule with a hybrid type may be generated if the target of an edit is ambiguous. For example, if the user 101 edits the text of a uniform slide title, his/her intention could be to edit that kind of shape or that kind of text run. In such cases, the first editing rule of a shape-run type may be generated. For another instance, if the user 101 edits the first or last paragraph of a text box, his/her intention could be to edit that kind of paragraph or that kind of text run. In such cases, the first editing rule of a paragraph-run type may be generated. In other implementations, if the target of the edit is ambiguous, more than one first editing rule may be generated. Taking a same example as described above, if the user 101 edits the first or last paragraph of a text box, two first editing rules may be generated, one with a paragraph type and the other with a text-run type.

Figure 3:
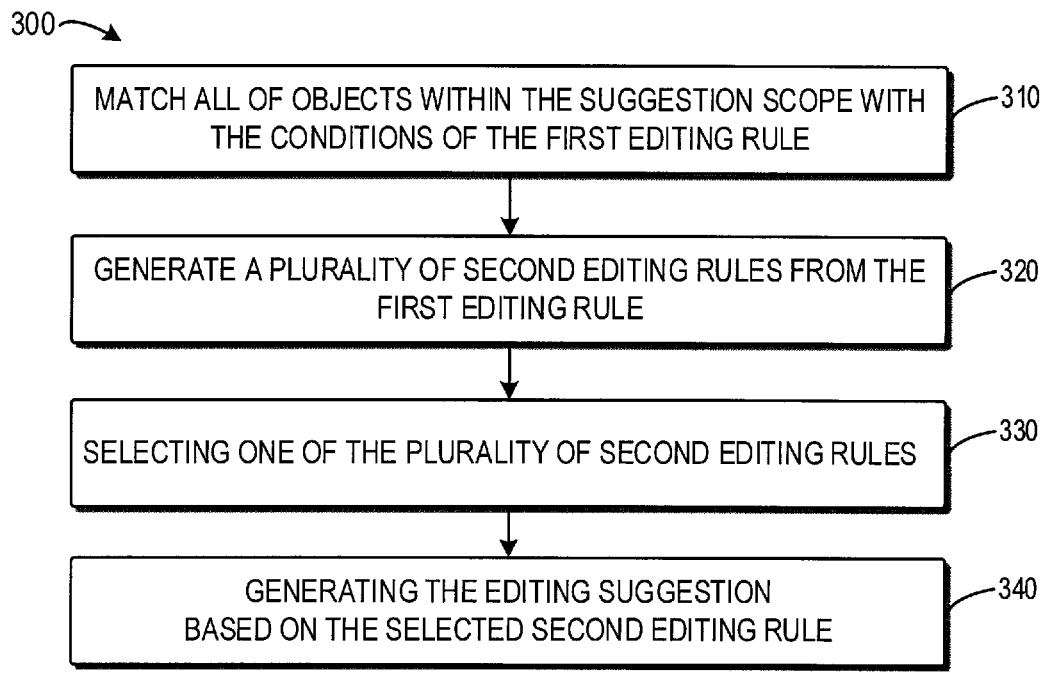
FIG. 3 is a flowchart of a method 300 for generating an editing suggestion in accordance with implementations of the present invention.

Then the method 200 proceeds to step 220, where an editing suggestion is generated based on the first editing rule. In some implementations, this can be done by computing "relaxed" editing rules. For example, FIG. 3 shows a flowchart of a method 300 for generating the editing suggestion in accordance with implementations of the present invention. The editing suggestion may describe a candidate edit to be performed on a second object within a suggestion scope, such as the second object 115.

In step 310, all of objects within the suggestion scope are matched with the conditions of the first editing rule.

In some implementations, the suggestion scope may be the whole document 103 in order to propagate a formatting change throughout the document when a direct edit is performed. That is, all of objects within the document 103 are considered as objects matching the conditions of the first editing rule. In some implementations, the suggestion scope is updated according to the user's operation. For example, when the user 101 navigates to one of the plurality of editing units, such as the editing unit 105, the suggestion scope is updated to include the editing unit 105 such that all of objects within the editing unit 105 are treated as matching objects of the conditions of the first editing rule.

As described above, all conditions of the first editing rule should be satisfied by an object that matches the first editing rule. However, in step 310, each object within the suggestion scope may be considered, and some conditions of the first editing rule may be relaxed to match the object, which may result in a "relaxed" editing rule being generated. Only for the purpose of illustration, in the following discussions, a "relaxed" editing rule generated from the first editing rule is also referred to as a "second editing rule".

Then the method 300 proceeds to step 320, where one or more second editing rules are generated from the first editing rule. The conditions of each of the second editing rules is a subset of the conditions of the first editing rule, where each of the second editing rules matches at least one of the objects within the suggestion scope, as described above. In some implementations, a second editing rule may be removed if conditions of this second editing rule are a subset of conditions of another second editing rule. That is because a more "relaxed" editing rule can always be reached by first applying a less "relaxed" editing rule, as will be discussed later.

The method 300 proceeds to step 330, where one of the plurality of second editing rules is selected. This can be done by calculating and comparing weights assigned to the relaxed conditions of the first editing rule for each of the second editing rules.

In some implementations, a weight may be assigned to each of the conditions of the first editing rule that is relaxed to generate a respective second editing rule. The weights assigned to different relaxed conditions may be same or different. A lower weight for a relaxed condition may encourage an editing suggestion with the relaxed condition to be generated, as will be discussed later. A sum of the weights may be calculated for each of the second editing rules and the second editing rules may be ordered by the sum of the weights. In some implementations, one of the second editing rules with the minimum sum of the weights may be selected, since it has a minimal difference from the first editing rule matches. The selected second editing rule may match the most similar object with the object edited by the user. In this way, visual consistency within the suggestion scope may be maximized.

Then the method 300 proceeds to step 340, where the editing suggestion is generated based on the selected second editing rule.

In some implementations, more than one first editing rule can be maintained to support parallel editing, each of which may have a different priority. The most recently generated (or updated, for example, as will be described with reference to FIG. 5 later) one may have the top priority, which may be referred to as an "active" editing rule. It would be appreciated that in some implementations, one editing suggestion may be generated only based on the "active" editing rule. Alternatively, or in addition, one editing suggestion may be generated based on each of the first editing rules, which may result in multiple editing suggestions being generated.

In some implementations, if the edit performed on the first object 114 is a spatial edit, such as changing the size or position of a shape, exact spatial attributes (for example, left-edge position, right-edge position, top-edge position and bottom-edge position) may not be used for generating the first editing rule, while relative spatial attributes (for example, width, height, area, center-x, center-y and the like) may be used instead in order to match objects whose edges are in similar but not identical positions across slides. However, it should be understood that in other implementations, exact spatial attributes can be used for generating the first editing rule, depending on different situations. Moreover, in some implementations, if the first object 114 is moved by the user 101, the second editing rules (that are candidates for the editing suggestion) may be generated base on some specific alignment and resizing options, such as aligning top left corner, aligning top right corner, aligning bottom right corner, aligning bottom left corner and/or aligning all edges (that is, resizing to match). The ordering of the second editing rules may be based on the direction of the movement of the first object 114. Alternatively, or in addition, the editing suggestion may be filtered in order to avoid excessive shape shrinkage or left-right/top-bottom inversion.

Still in reference with FIG. 2, the method 200 proceeds to step 230, where the editing suggestion is presented to the user 101 for selection in a visual form. As described above, the editing suggestion may describe a candidate edit to be performed on a second object, such as the second object 115. In some implementations, a user interface may be provided to present the editing suggestion. Alternatively, or in addition, the editing suggestion may be presented as a preview of the document 103 with the editing suggestion being applied to the second object 115. In some implementations, the editing suggestion may be presented to the user 101 with highlighting a change on the second object 115, such that the user 101 can visually compare the difference between current document state and the state after applying the editing suggestion. Alternatively, or in addition, a readable description about the editing suggestion may be provided in case that precise details of the editing suggestion are important but not clear from the preview alone (for example, an exact font size). For example, FIG. 4 shows a schematic diagram of visual editing suggestions in accordance with implementations of the present invention.

Figure 4:
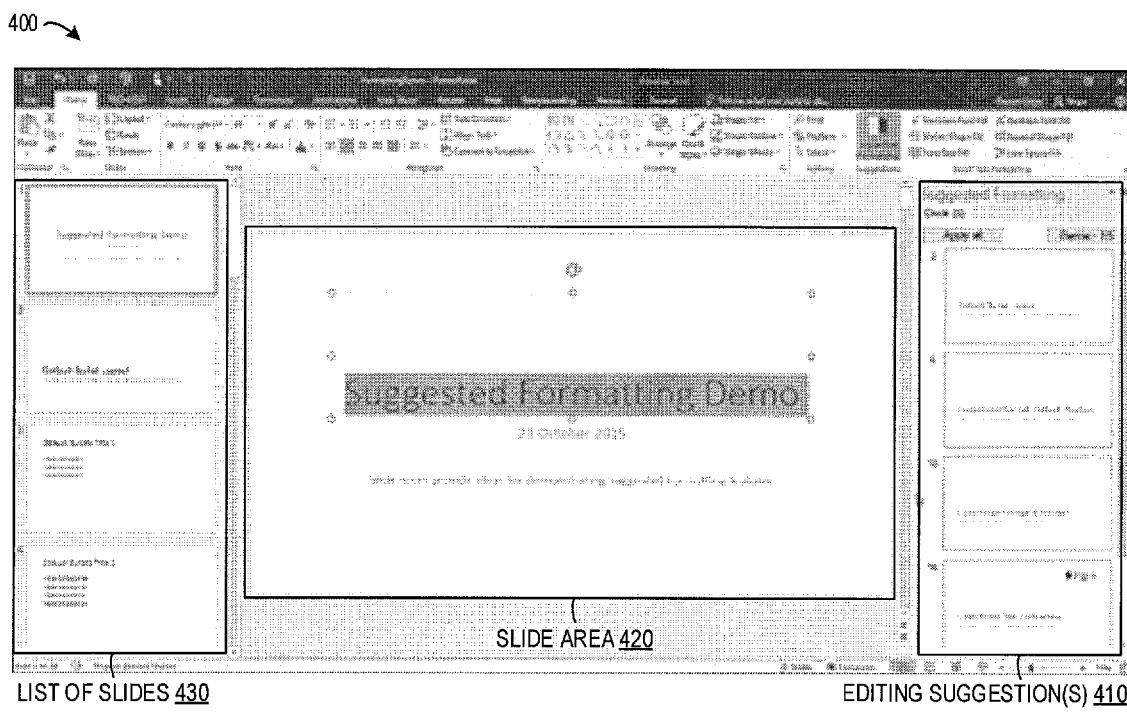
FIG. 4 is a schematic diagram of visual editing suggestions in accordance with implementations of the present invention.

As shown in FIG. 4, the editing suggestion 410 may be shown in a vertical list to the right of the slide area 420, clearly differentiated from the existing list 430 of slides shown to the left of the slide area. In some implementations, the presentation of the editing suggestion may be activated manually, such as by pressing a button on the user interface. In some other implementations, the presentation of the editing suggestion may be activated automatically, for example, when it appears that the user is making a repetitive edit in the document. The activation threshold may be set as a number of repeated applications of a same edit, for example.

In some implementations, after the editing suggestion being presented to the user 101, the user 101 may send a request for replacing the editing suggestion if the editing suggestion does not satisfy the user 101. In response to receiving from the user 101 a request for replacing the editing suggestion, an alternative editing suggestion may be generated. For example, as described above with reference to FIG. 3, further editing suggestions may be generated based on the plurality of second editing rules (that are the "relaxed" editing rules) other than the one associated with the editing suggestion to be replaced, and then the further editing suggestions may be presented to the user for selection in an order associated with differences between the plurality of second editing rules and the first editing rule (for example, indicated by the sum of the weights).

In other implementations, the user 101 may select the editing suggestion, in case that the editing suggestion satisfies the user 101. In response to the editing suggestion being selected by the user 101, the editing suggestion may be applied to the second object 115.

Figure 5:
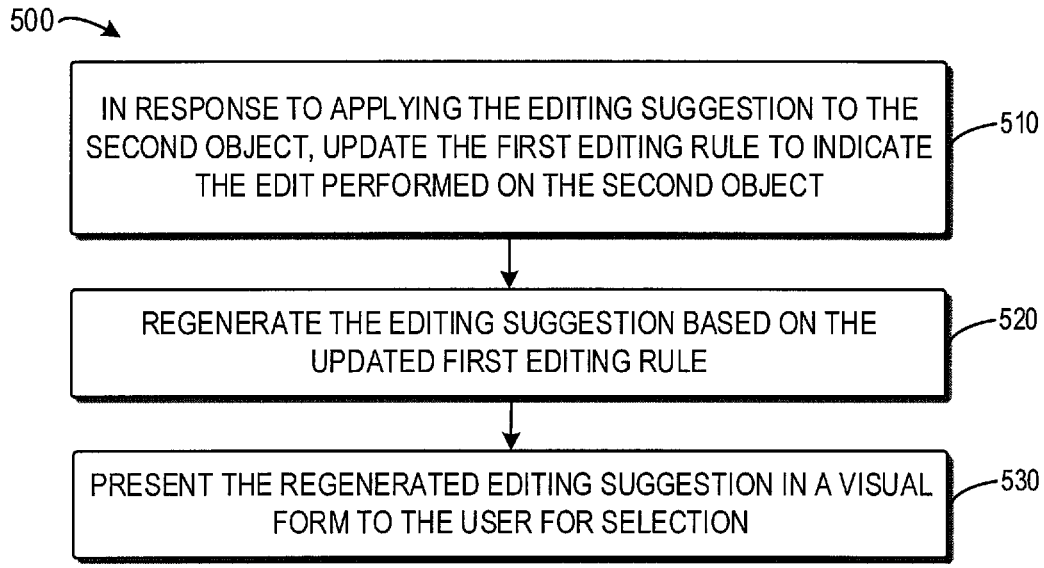
FIG. 5 is a flowchart of a method 500 for a process in response to applying an editing suggestion in accordance with implementations of the present invention.

For example, FIG. 5 shows a flowchart of a method 500 for a process in response to applying an editing suggestion in accordance with implementations of the present invention. The method 500 can be implemented by the computing device 102 as shown in FIG. 1, for example. Alternatively, or in addition, the method 500 can be implemented as part of the document editing application 121. The method 500 will be described in connection with the example shown in FIG. 1. Only for the purpose of illustration, in the following discussions, the object 117 is referred to as the "fourth object".

In step 510, in response to applying the editing suggestion to the second object 115, the first editing rule is updated to indicate the edit performed on the second object 115. In some implementations, the first editing rule may be regenerated to indicate the edit performed on the second object 115. Alternatively, or in addition, in case that multiple (for example, 3) first editing rules are supported, the regenerated first editing rule may be promoted to be the "active" editing rule with the top priority, while the one with the previous bottom priority may be removed. Then, in step 520, the editing suggestion is regenerated based on the updated first editing rule. The process of regenerating the editing suggestion may be in accordance with the method 300 as described above with reference to FIG. 3. For example, the regenerated editing suggestion may describe a candidate edit to be performed on a fourth object, such as the fourth object 117. The method 500 proceeds to step 530, where the regenerated editing suggestion is presented to the user for selection in a visual form.

Figure 6:
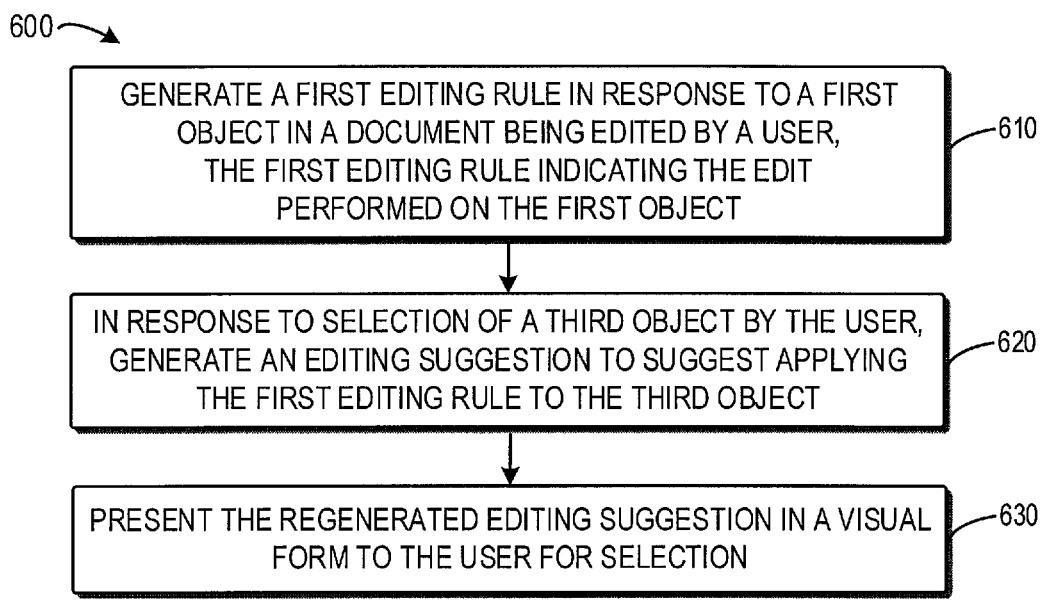
FIG. 6 is a flowchart of a method 600 for formatting document objects by visual suggestions in accordance with implementations of the present invention.

In some cases, for example as shown in FIG. 1, after the user 101 makes a direct edit on the first object 114, the user may have an intention to perform a similar edit on the object 116. However, the third object 116 may be at a particular slide region like "upper left" or "overlapping object X", whose conditions may not be able to be expressed as "Attribute:Value" pairs. In order to provide a solution for such cases, for example, FIG. 6 shows a flowchart of a method 600 for formatting document objects by visual suggestions in accordance with implementations of the present invention. The method 600 can be implemented by the computing device 102 as shown in FIG. 1, for example. Alternatively, or in addition, the method 600 can be implemented as part of the document editing application 121. The method 600 will be described in connection with the example shown in FIG. 1. Only for the purpose of illustration, in the following discussions, the object 116 is referred to as the "third object".

In step 610, a first editing rule is generated in response to the first object 114 in the document 103 being edited by the user 101. The first editing rule indicates the edit performed on the first object 114. Then, in step 620, in response to selection of the third object 116 by the user 101, an editing suggestion is generated to suggest applying the first editing rule to the third object 116, instead of computing the "relaxed" editing rules as described above with reference to FIG. 3. Then, the method 600 proceeds to step 630, where the regenerated editing suggestion is presented to the user for selection in a visual form.

The methods for formatting document objects described so far are all driven by an edit (such as a direct edit or an edit by applying an editing suggestion) that the user wishes to propagate throughout a document. However, in some situations, the formatting that the user wants to propagate may already exist within states of document objects. Implementations of the present invention also provide a solution for such cases.

Figure 7:
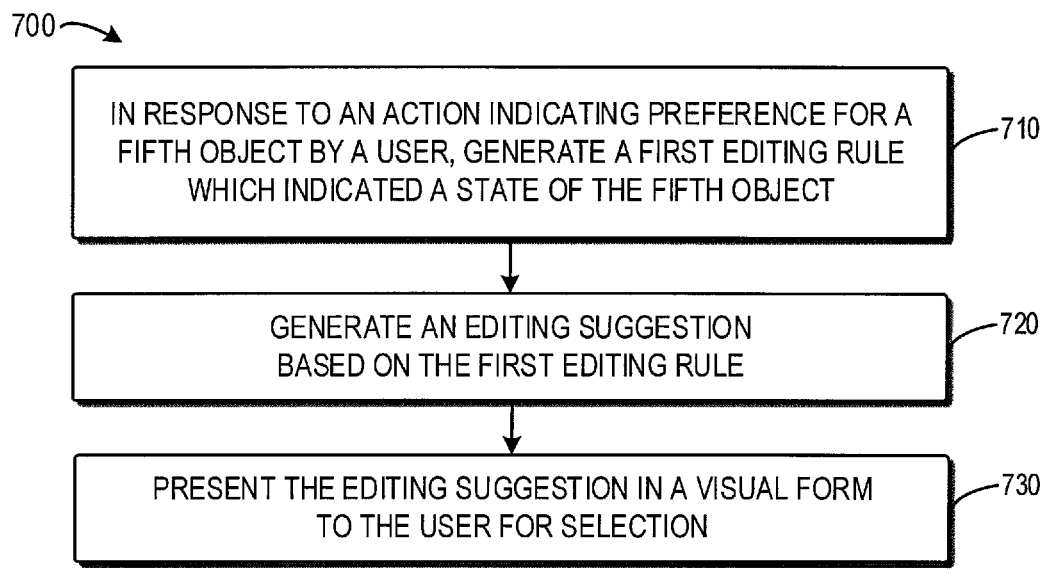
FIG. 7 is a flowchart of a method 700 for formatting document objects by visual suggestions in accordance with implementations of the present invention.

FIG. 7 shows a flowchart of a method 700 for formatting document objects by visual suggestions in accordance with implementations of the present invention. The method 700 can be implemented by the computing device 102 as shown in FIG. 1, for example. Alternatively, or in addition, the method 700 can be implemented as part of the document editing application 121. The method 700 will be described in connection with the example shown in FIG. 1. Only for the purpose of illustration, in the following discussions, the object 118 is referred to as the "fifth object" and the object 119 is referred to as the "sixth object".

In step 710, a first editing rule is generated in response to an action indicating preference for the fifth object 118 by the user 101. In some implementations, the action indicating preference for the fifth object 118 may be, for example, selecting the fifth object 118 and pressing a "like" button (or an equivalent). In response to the action, the first editing rule (5) can be generated as follows.

(All Attribute:Value pairs of the liked fifth object 118)=>(All Attribute:Value pairs of the liked fifth object 118)     (5)

In some implementations, the user 101 may "like" more than one object. Accordingly, the following rule (6) can be generated.

(All Attribute:Value pairs shared by all liked objects) =>(All Attribute:Value pairs shared by all liked objects)     (6)

Liking more than object may enable propagating a subset of the shared attributes of the liked objects. For example, suppose that there are three objects "X", "Y" and "Z" in total, whose "Attribute:Value" pairs may be shown as follows:

X:(A:1,B:1,C:1)

Y:(A:2,B:2,C:1)

Z:(A:1,B:2,C:1)  (7)

The user 101 may "like" the object "X" because of the value of the attribute "A" being 1, but he/her may not want to propagate the attribute "B" of the object "X" to other objects. In such a case, the user may also "like" the object "Z" since the value of the attribute "B" of the object "Z" differs from that of the object "X". In this way, the following rule (8) can be generated, which results in the value of the attribute "B" of other objects being not changed.

(A:1,C:1)=>(A:1,C:1)  (8)

Then the method 700 proceeds to step 720, where an editing suggestion is generated based on the first editing rule. In some implementations, this can be done similarly according to the method 300 as described above with reference to FIG. 3. In other implementations, this can be done in response to selection of another object by the user 101 and the editing suggestion may be generated to suggest applying the first editing rule to the other object as described with reference to FIG. 6. For example, the generated editing suggestion may describe a candidate edit to be performed on the sixth object 119.

The method 700 proceeds to step 730, where the editing suggestion is presented to the user for selection in a visual form. In this way, formatting document objects can be driven by states of a document object already existed in the document.

It would be appreciated that in some implementations, the method 500 also may be carried out after the methods 600 and 700 and in response to the user 101 selecting to apply the editing suggestion.

In some implementations, more than one editing suggestions can be generated based on the first editing rule, and all of the editing suggestions can be presented to the user via a same user interface for selection. The user may select the presented editing suggestions individually or select to apply them all at once.

Further, in some implementations, if the user navigates to one editing unit of the document, in addition to generating editing suggestions only matching objects within the editing unit, other editing suggestions matching objects within the whole document can also be provided for selection, for example, with lower priorities than the former ones. Likewise, other variations can be envisaged in light of the subject matter described herein.

Through the above descriptions, it would be appreciated that implementations of the subject matter as described herein allow minimizing the user actions required to make formatting changes throughout a document by showing editing suggestions of how recent edits could be applied anywhere. In addition, in accordance with implementations of the subject matter described herein, if the user's edits introduce any inconsistencies, the system will provide the user an alert and a suggestion of correction, thereby ensuring visual consistency throughout the document. Further, implementations of the subject matter described herein provide a solution for propagating the edits performed by the user throughout a document using a process in an interactive fashion.

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Some example implementations of the subject matter described herein are listed below.

In an aspect, a device is provided. The device comprises a processing unit and a memory, the memory being coupled to the processing unit and storing instructions for execution by the processing unit, the instructions, when executed by the processing unit, causing the device to generate a first editing rule, the first editing rule indicating an edit performed on a first object in a document; generate an editing suggestion based on the first editing rule, the editing suggestion describing a candidate edit to be performed on a second object within a suggestion scope; and present the editing suggestion in a visual form to a user for selection.

In some implementations, the instructions, when executed by the processing unit, further cause the device to apply the editing suggestion to the second object in response to the editing suggestion being selected by the user.

In some implementations, the first editing rule comprises a plurality of conditions and a conclusion, the plurality of conditions indicating attribute-value pairs of the first object prior to the edit, the conclusion indicating an edited attribute-value pair of the first object, and the instructions, when executed by the processing unit, further cause the device to generate, from the first editing rule, a plurality of second editing rules, each of the plurality of second editing rules matching at least one of the objects within the suggestion scope, and conditions of the plurality of second editing rules being included in the plurality of conditions of the first editing rule; select one of the plurality of second editing rules, the selected second editing rule having a minimal difference from the first editing rule; and generate the editing suggestion based on the selected second editing rule.

In some implementations, the instructions, when executed by the processing unit, further causes the device to generate further editing suggestions based on the plurality of second editing rules other than the selected second editing rule; and present the further editing suggestions to the user for selection in an order associated with differences of the plurality of second editing rules and the first editing rule.

In some implementations, the instructions, when executed by the processing unit, further cause the device to generate, in response to selection of a third object by the user, an editing suggestion that suggests applying the first editing rule to the third object.

In some implementations, the instructions, when executed by the processing unit, further cause the device to present, via a user interface, the editing suggestion as a preview of the document with the editing suggestion being applied to the second object.

In some implementations, the instructions, when executed by the processing unit, further causes the device to update the first editing rule to indicate the edit performed on the second object in response to applying the editing suggestion to the second object; regenerate the editing suggestion based on the updated first editing rule, the regenerated editing suggestion describe a candidate edit to be performed on a fourth object within the suggestion scope; and present the regenerated editing suggestion in a visual form to the user for selection.

In some implementations, the document includes a plurality of editing units, and the instructions, when executed by the processing unit, further cause the device to update the suggestion scope to be one of the plurality of editing units in response to the user navigating to the one of the plurality of editing units.

In some implementations, the instructions, when executed by the processing unit, further cause the device to generate the first editing rule indicating a state of a fifth object in response to an action indicating preference for the fifth object by the user.

In another aspect, a method is provided. The method comprises generating a first editing rule, the first editing rule indicating an edit performed on a first object in a document; generating an editing suggestion based on the first editing rule, the editing suggestion describing a candidate edit to be performed on a second object within a suggestion scope; and presenting the editing suggestion in a visual form to a user for selection.

In some implementations, the method further comprises in response to the editing suggestion being selected by the user, applying the editing suggestion to the second object.

In some implementations, the first editing rule comprises a plurality of conditions and a conclusion, the plurality of conditions indicating attribute-value pairs of the first object prior to the edit, the conclusion indicating an edited attribute-value pair of the first object, and generating the editing suggestion based on the first editing rule comprises generating, from the first editing rule, a plurality of second editing rules, each of the plurality of second editing rules matching at least one of the objects within the suggestion scope, and conditions of the plurality of second editing rules being included in the plurality of conditions of the first editing rule; selecting one of the plurality of second editing rules, the selected second editing rule having a minimal difference from the first editing rule; and generating the editing suggestion based on the selected second editing rule.

In some implementations, the method further comprises generating further editing suggestions based on the plurality of second editing rules other than the selected second editing rule; and presenting the further editing suggestions to the user for selection in an order associated with differences of the plurality of second editing rules and the first editing rule.

In some implementations, generating an editing suggestion based on the first editing rule comprises in response to selection of a third object by the user, generating an editing suggestion which suggests applying the first editing rule to the third object.

In some implementations, presenting the editing suggestion in a visual form to the user for selection comprises presenting, via a user interface, the editing suggestion as a preview of the document with the editing suggestion being applied to the second object.

In some implementations, the method further comprises in response to applying the editing suggestion to the second object, updating the first editing rule to indicate the edit performed on the second object; regenerating the editing suggestion based on the updated first editing rule, the regenerated editing suggestion describe a candidate edit to be performed on a fourth object within the suggestion scope; and presenting the regenerated editing suggestion in a visual form to the user for selection.

In some implementations, the suggestion scope is the whole document.

In some implementations, the document includes a plurality of editing units, and wherein the method further comprises in response to the user navigating to one of the plurality of editing units, updating the suggestion scope to be the one of the plurality of editing units.

In some implementations, the method further comprises in response to an action indicating preference for a fifth object by the user, generating the first editing rule which indicates a state of the fifth object.

In yet another aspect, a computer program product is provided. The computer program product is tangibly stored on a non-transient machine-readable medium and comprises machine-executable instructions, the instructions, when executed on a device, causing the device to perform steps of the method.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device comprising:
   a processing unit;
   a memory coupled to the processing unit and storing instructions for execution by the processing unit, the instructions, when executed by the processing unit, causing the device to:
   receive an edit performed on a first object in a document, wherein the first object is a portion of the document having a first attribute-value pair;
   based on the edit performed on the first object in the document, generate a first editing rule, the first editing rule indicating the edit performed on the first object in a document;
   generate an editing suggestion based on the first editing rule, the editing suggestion describing a candidate edit to be performed on a second object, having a second attribute-value pair, which is the same as the first attribute-value pair, within a suggestion scope; and
   present the editing suggestion in a visual form to a user for selection.

2. The device of claim 1, wherein the instructions, when executed by the processing unit, further cause the device to:
   in response to the editing suggestion being selected by the user, apply the editing suggestion to the second object.

3. The device of claim 1, wherein the first editing rule comprises a plurality of conditions and a conclusion, the conclusion indicating an edited attribute-value pair of the first object, and
   wherein the instructions, when executed by the processing unit, cause the device to:
      generate, from the first editing rule, a plurality of second editing rules, each of the plurality of second editing rules matching at least one of the objects within the suggestion scope, and conditions of the plurality of second editing rules being included in the plurality of conditions of the first editing rule;
      select one of the plurality of second editing rules, the selected second editing rule applying to a greater number of objects than the first editing rule; and
      generate the editing suggestion based on the selected second editing rule.

4. The device of claim 3, wherein the instructions, when executed by the processing unit, further cause the device to:
   generate further editing suggestions based on the plurality of second editing rules other than the selected second editing rule; and
   present the further editing suggestions to the user for selection in an order associated with differences of the plurality of second editing rules and the first editing rule.

5. The device of claim 1, wherein the instructions, when executed by the processing unit, further cause the device to:
   in response to selection of a third object by the user, generate an editing suggestion that suggests applying the first editing rule to the third object.

6. The device of claim 1, wherein the instructions, when executed by the processing unit, further cause the device to:
   present, via a user interface, the editing suggestion as a preview of the document with the editing suggestion being applied to the second object.

7. The device of claim 6, wherein the instructions, when executed by the processing unit, further cause the device to:
   in response to applying the editing suggestion to the second object, update the first editing rule to indicate the edit performed on the second object;
   regenerate the editing suggestion based on the updated first editing rule, the regenerated editing suggestion describe a candidate edit to be performed on a fourth object within the suggestion scope; and
   present the regenerated editing suggestion in a visual form to the user for selection.

8. The device of claim 1, wherein the document includes a plurality of editing units, and wherein the instructions, when executed by the processing unit, further cause the device to:
   in response to the user navigating to one of the plurality of editing units, update the suggestion scope to be the one of the plurality of editing units.

9. The device of claim 1, wherein the instructions, when executed by the processing unit, further cause the device to:
   in response to an action indicating preference for a fifth object by the user, generate the first editing rule indicating a state of the fifth object.

10. A computer-implemented method comprising:
    receiving, by a computing device, an edit performed on a first object in a document wherein the first object is a portion of the document;
    determining, by the computing device, a first attribute-value pair associated with the first object;
    based on the edit performed on the first object in the document, generating, by the computing device, a first editing rule, the first editing rule indicating the edit performed on the first object in the document;
    determining, by the computing device, that a second object includes a second attribute-value pair, which is the same as the first attribute-value pair;
    based on the second object including the second attribute-value pair, generating an editing suggestion based on the first editing rule, the editing suggestion describing a candidate edit to be performed on the second object within a suggestion scope; and
    presenting the editing suggestion in a visual form to a user for selection.

11. The method of claim 10, further comprising:
    in response to the editing suggestion being selected by the user, applying the editing suggestion to the second object.

12. The method of claim 10, wherein the first editing rule comprises a plurality of conditions and a conclusion, the plurality of conditions indicating attribute-value pairs of the first object prior to the edit, the conclusion indicating an edited attribute-value pair of the first object, and
    wherein generating the editing suggestion based on the first editing rule comprises:
       generating, from the first editing rule, a plurality of second editing rules, each of the plurality of second editing rules matching at least one of the objects within the suggestion scope, and conditions of the plurality of second editing rules being included in the plurality of conditions of the first editing rule;
       selecting one of the plurality of second editing rules, the selected second editing rule applying to a greater number of objects than the first editing rule; and
       generating the editing suggestion based on the selected second editing rule.

13. The method of claim 12, further comprising:
    generating further editing suggestions based on the plurality of second editing rules other than the selected second editing rule; and presenting the further editing suggestions to the user for selection in an order associated with differences of the plurality of second editing rules and the first editing rule.

14. The method of claim 10, wherein generating an editing suggestion based on the first editing rule comprises:
in response to selection of a third object by the user, generating an editing suggestion which suggests applying the first editing rule to the third object.

15. The method of claim 10, wherein presenting the editing suggestion in a visual form to the user for selection comprises:
presenting, via a user interface, the editing suggestion as a preview of the document with the editing suggestion being applied to the second object.

16. The method of claim 15, further comprising:
in response to applying the editing suggestion to the second object, updating the first editing rule to indicate the edit performed on the second object;
regenerating the editing suggestion based on the updated first editing rule, the regenerated editing suggestion describe a candidate edit to be performed on a fourth object within the suggestion scope; and
presenting the regenerated editing suggestion in a visual form to the user for selection.

17. The method of claim 10, wherein the suggestion scope is the whole document.

18. The method of claim 10, wherein the document includes a plurality of editing units, and wherein the method further comprises:
in response to the user navigating to one of the plurality of editing units, updating the suggestion scope to be the one of the plurality of editing units.

19. The method of claim 10, further comprising:
in response to an action indicating preference for a fifth object by the user, generating the first editing rule indicating a state of the fifth object.

20. A computer program product being tangibly stored on a non-transient machine-readable medium and comprising machine-executable instructions, the instructions, when executed on a device, causing the device to perform a method, the method comprising:
receiving, by a computing device, an edit performed on a first object in a document;
determining, by the computing device, a first attribute-value pair associated with the first object;
based on the edit performed on the first object in the document, generating, by the computing device, a first editing rule, the first editing rule indicating the edit performed on the first object in the document;
determining, by the computing device, that a second object comprises a second attribute-value pair, which is the same as the first attribute-value pair;
based on the second object including the second attribute-value pair, generating an editing suggestion based on the first editing rule, the editing suggestion describing a candidate edit to be performed on a second object within a suggestion scope; and
presenting the editing suggestion in a visual form to a user for selection.

* * * * *